July 6, 1937.   H. V. LUDWICK   2,086,134
METHOD OF MAKING A TANK FOR A TANK TRUCK
Filed Dec. 11, 1934   2 Sheets-Sheet 1
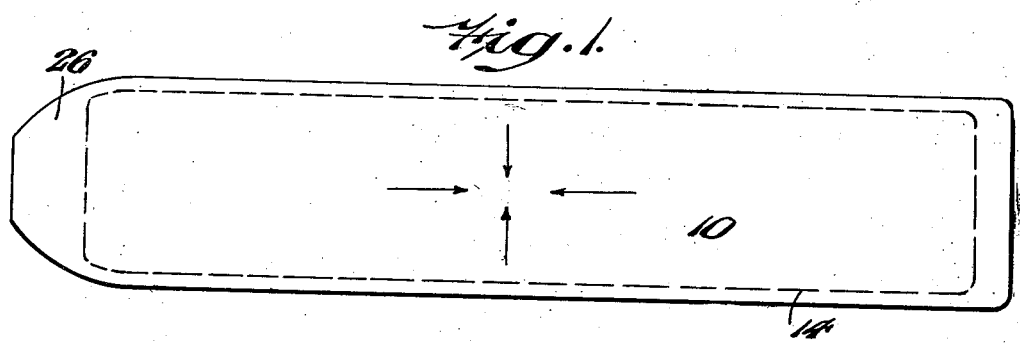
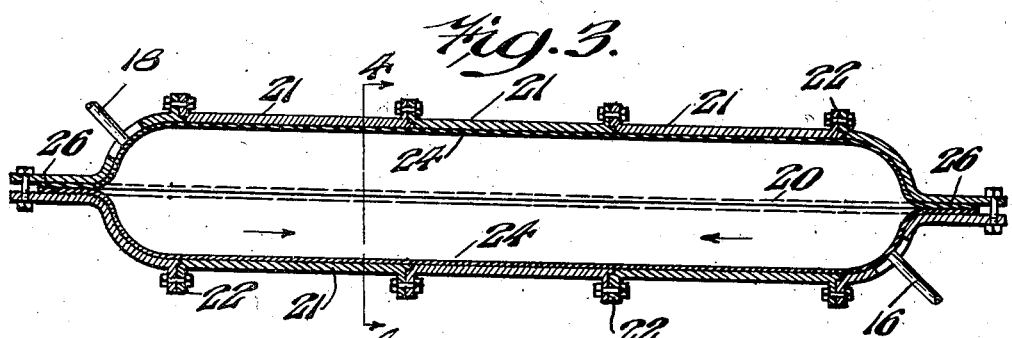
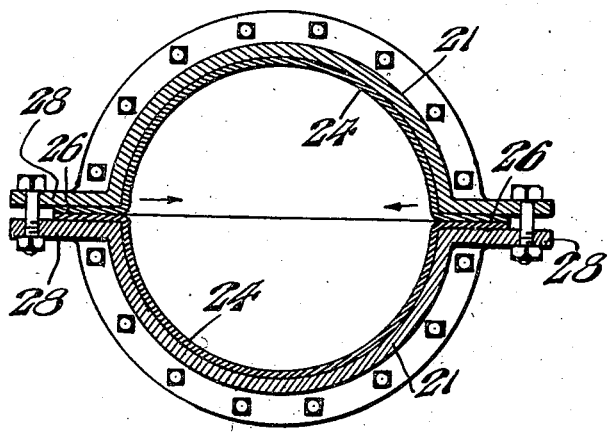
INVENTOR
HERBERT V. LUDWICK,
BY Louis Necho
ATTORNEY

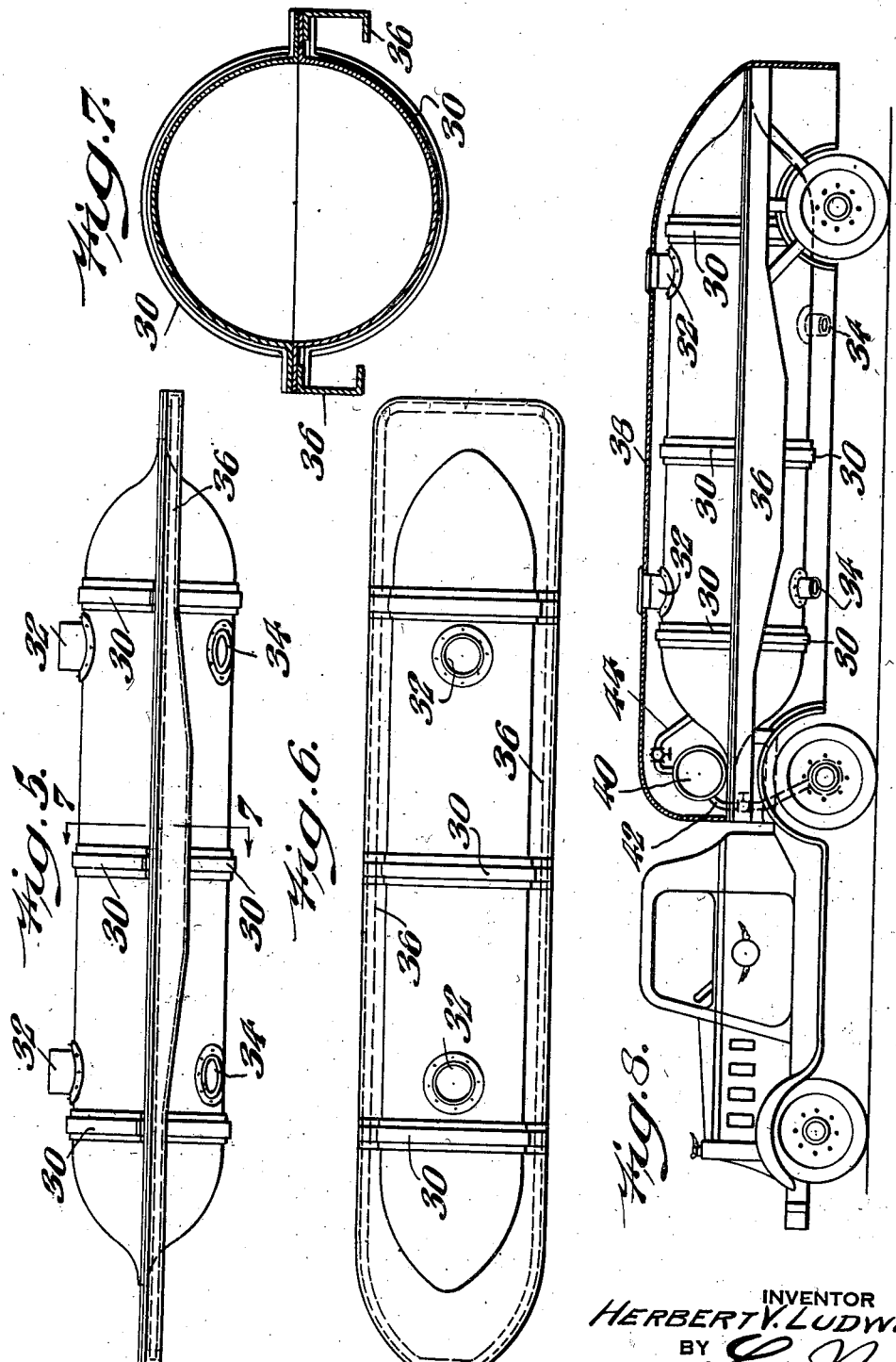

Patented July 6, 1937

2,086,134

UNITED STATES PATENT OFFICE 2,086,134

METHOD OF MAKING A TANK FOR A TANK TRUCK

Herbert V. Ludwick, Dearborn, Mich.

Application December 11, 1934, Serial No. 756,919

2 Claims. (Cl. 113—120)

My invention relates to a new and useful tank truck and method of making the same, whereby a tank truck of the type ordinarily employed for the hauling of liquids, such as oils, gasolines, milk, etc., may be produced by a novel method at a reduced cost.

My invention further relates to a tank truck of this type in which the present load capacity is greatly increased in proportion to the total dead weight of the complete vehicle, thereby increasing the efficiency and earning capacity of the tank truck.

My invention still further relates to a tank truck, the liquid containing tank of which is of an extremely rigid but relative light construction calculated to withstand the stress and torque to which it may be subjected in actual use on the road.

My invention still further relates to a tank truck construction which includes means for effectively discharging the contents of the tank by utilizing the power plant of a truck.

My invention still further relates to a tank truck, the liquid containing tank of which may be formed of stainless steel or other sheet metal, and the surface of which is treated to resist corrosion to permit the shipping therein of edible liquids in a sanitary manner and at the same time to increase the life of the tank.

My invention still further relates to a novel method of making a tank truck from initially flat pieces of sheet metal without the necessity of forming or shaping the sections of the tank separately or prior to their assembly.

My invention still further relates to a novel method of mounting the tank of a tank truck with respect to the chassis of an automotive vehicle and to various other features of construction and advantage, all as hereinafter more fully set forth and claimed in connection with the accompanying drawings, in which:

Fig. 1 represents a plan view of two superimposed flat sheets of metal from which the tank of my novel tank truck is formed according to my novel method.

Fig. 2 represents a side elevation of Fig. 1.

Fig. 3 represents a vertical sectional view illustrating a step in the method of forming the tank.

Fig. 4 represents a cross section, on an enlarged scale, on line 4—4 of Fig. 3.

Fig. 5 represents a side elevation of the tank illustrating the second step in the process of manufacture.

Fig. 6 represents a plan view of Fig. 5.

Fig. 7 represents a cross section, on an enlarged scale, on line 7—7 of Fig. 5.

Fig. 8 represents a diagrammatic side elevation showing the tank encased and mounted on the chassis of an automotive vehicle and also diagrammatically illustrating the means and method for discharging contents of a tank.

Referring to the drawings in which like reference characters indicate like parts, and more particularly to Figs. 1 and 2, my novel tank is formed of the initially upper and lower flat metal sheets 10 and 12 which are superimposed upon each other after having been cut to the desired dimensions, the thickness or tensile strength of the metal being in proportion to the duty to be performed. The sheets 10 and 12 are welded together along or near their outer perimeter at approximately the point shown by the dotted line 14 in Fig. 1. At the bottom and near the end of the sheet 12 I provide an inlet 16 which is suitably controlled by any desired valve and which leads to a source of liquid under pressure not shown. At the opposite end and near the end of the upper sheet 10, I provide a controlled air vent or outlet 18. The sheets 10 and 12, assembled as shown in Fig. 2 having their edges welded together as described and provided with the inlet 16 and vent 18, are then placed as shown by the dotted lines 20 within an external confining outer shoe or casing, which is formed of sections 21 and which is assembled and retained by the bolts or other means 22. The outer confining sectional shell is of a size and shape to conform to the form of the tank to be produced. With the parts assembled, as shown in Fig. 3, I introduce through the inlet 16 a liquid under pressure, such as water or any other desired liquid, the pressure of which is calculated to separate the sheets 10 and 12 and push them apart upwardly and downwardly against the walls of the outer sectional confining shell, thereby changing the form of the sheets 10 and 12 from the flat form shown in Figs. 1 and 2 and in dotted lines in Fig. 3 to the form of the outer confining shell as shown at 24 in Figs. 3 and 4. Any air that many initially have existed between the sheets 10 and 12 is expelled through the air vent 19. It is to be understood that the edges 26 of the sheets 10 and 12 are not clamped tightly between the corresponding flanges 28 of the corresponding sections of the outer confining shell, so that as the sheets 10 and 12 are bent into their circular or cylindrical form the longitudinal and transverse edges 26 of the sheets 10 and 12 are drawn together in the direction of the arrows in Figs. 1, 3 and 4 to enable the sheets 10 and 12 to be deflected into their circular or cylindrical form without effecting any appreciable stretching of the metal sheets 10 and 12 themselves, thereby not only retaining the initial strength of the sheets 10 and 12 but also preserving any special finish on their interior surfaces. The sheets 10 and 12 thus formed by hydraulic pressure to conform to the contour of the outer confining shell, which represents the size and shape of the tank to be formed, now assume the form shown in Fig. 5 and are bound with the reinforcing bands 30. The finished tank is provided with the valve inlets 32 and with the drain outlets 34 and is mounted on the channel irons 36, which in turn are suitably mounted on the chassis of an automotive vehicle or trailer in any desired manner, as diagrammatically illustrated in Fig. 8. If desired, I may close the completed tank with the outer protective shell or covering 38, which may be stream-line, if desired.

In order to be able to discharge the contents of the tank by means other than gravity, I provide the compressed air storage tank 40, into which air is compressed by compressors (not shown) operated by the power plant of the truck. From the compression tank 40 a conduit 42 leads downwardly and supplies compressed air necessary for operating the brakes and the conduit 44 leads into the adjacent end of the tank, so that by introducing air under pressure into the adjacent end of the tank the liquid contents thereof can be discharged and delivered at a point higher than the level of liquid in the tank.

It will thus be seen that by my novel construction a substantially cylindrical tank is formed from initially flat contiguous sheets of metal, the edges of which are welded and which are separated and formed into the desired shape by means of hydraulic pressure, and that the curvature is produced by shortening the longitudinal and transverse diameters rather than by stretching of the metal itself, thus enabling me to produce a tank of this character from a sheet metal either of the stainless steel variety or of a type the inner surface of which is covered with enamel or other coating to adapt the tank for containing any special edible or other liquids without in any way changing the surface of the metal or destroying its finish. Due to the fact that there are no radial welds in the line of tortion, I am enabled to make my tank of a relatively lighter gage of metal than would be necessary in the construction of a similar tank for similar duty which is built up of formed and welded sections.

I claim:

1. The method of making a tank for a tank truck which consists in superimposing two congruent sheets of metal, welding said sheets together along a line near their perimeter, forming a liquid inlet near one end of said sheets and an air outlet near the other end of said sheets, and introducing a liquid under pressure through said inlet to separate said sheets and deflect them into the desired form.

2. The method of making a tank for a tank truck which consists in superimposing two congruent sheets of metal, welding said sheets together along a line near their perimeter, forming a liquid inlet near the end of one of said sheets and an air outlet near the end of the other of said sheets, and introducing a liquid under pressure through said inlet to separate said sheets and deflect them into the desired form.

HERBERT V. LUDWICK.